(12) United States Patent
Abe et al.

(10) Patent No.: US 9,300,100 B2
(45) Date of Patent: Mar. 29, 2016

(54) ROTATABLE CONNECTOR DEVICE HAVING A SIGNAL FLAT CABLE AND A DUMMY FLAT CABLE STACKED OVER AND SLIDABLE WITH RESPECT TO EACH OTHER

(71) Applicants: FURUKAWA ELECTRIC CO., LTD., Tokyo (JP); FURUKAWA AUTOMOTIVE SYSTEMS INC., Shiga (JP)

(72) Inventors: Fumihiko Abe, Tokyo (JP); Kengo Tanaka, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 14/513,726

(22) Filed: Oct. 14, 2014

(65) Prior Publication Data
US 2015/0031219 A1    Jan. 29, 2015

Related U.S. Application Data

(63) Continuation of application No. PCT/JP2013/070371, filed on Jul. 26, 2013.

(30) Foreign Application Priority Data

Jul. 26, 2012 (JP) ................................. 2012-165316

(51) Int. Cl.
| | |
|---|---|
| *H01R 3/00* | (2006.01) |
| *H01R 35/04* | (2006.01) |
| *H01R 35/02* | (2006.01) |
| *B60R 16/027* | (2006.01) |
| *H01R 13/6474* | (2011.01) |

(52) U.S. Cl.
CPC .............. *H01R 35/04* (2013.01); *B60R 16/027* (2013.01); *H01R 35/025* (2013.01); *H01R 13/6474* (2013.01); *H01R 2201/26* (2013.01)

(58) Field of Classification Search
CPC ........ H01R 35/025; H01R 35/00; H01R 35/02
USPC .......... 439/492–499, 67–69, 74, 422, 13, 164
See application file for complete search history.

(56) References Cited

U.S. PATENT DOCUMENTS 5,105,055 A * 4/1992 Mooney et al. .................. 174/27
5,683,259 A * 11/1997 Sato .............................. 439/164
(Continued)

FOREIGN PATENT DOCUMENTS

| JP | 2009-104907 A | 5/2009 |
| WO | 2011/136008 A1 | 11/2011 |

*Primary Examiner* — Chandrika Prasad
(74) *Attorney, Agent, or Firm* — Osha Liang LLP (57) ABSTRACT

An SRC includes a stator; a rotator rotatably attached to the stator; and a stack-type cable accommodated in an annular accommodation space defined by the stator and the rotator. The stack-type cable includes a transmission path FC including a pair of transmission path conductors and laminate sheets covering the pair of transmission path conductors and also includes a dummy FC that is provided on a front surface of the transmission path FC and is formed of laminate sheets not including a flat rectangular conductor, the transmission path FC and the dummy FC being stacked on each other; the stack-type cable further includes a grease that causes the transmission path FC and the dummy FC stacked on each other to adhere to each other; and a width-direction interval between the pair of transmission path conductors is set to smaller than, or equivalent to, a conductor width of each transmission path conductor.

5 Claims, 8 Drawing Sheets

(56) References Cited

U.S. PATENT DOCUMENTS

| | | | |
|---|---|---|---|
| 6,162,993 A * | 12/2000 | Barthelt | 174/117 F |
| 6,770,820 B2 * | 8/2004 | Sakurai et al. | 174/117 F |
| 7,663,064 B2 * | 2/2010 | Dutta et al. | 174/261 |
| 7,755,445 B2 * | 7/2010 | Dutta et al. | 333/1 |
| 2012/0238112 A1 * | 9/2012 | Takahashi et al. | 439/13 |

* cited by examiner

ROTATABLE CONNECTOR DEVICE HAVING A SIGNAL FLAT CABLE AND A DUMMY FLAT CABLE STACKED OVER AND SLIDABLE WITH RESPECT TO EACH OTHER

TECHNICAL FIELD

The present invention relates to a rotatable connector device, and more specifically to a rotatable connector device that has EMC (Electromagnetic Compatibility) improved to a required level and thus is usable for multiple high-speed communication.

BACKGROUND ART

A rotatable connector device includes a fixed-side member, a rotatable-side member rotatably attached to the fixed-side member, and a flat cable accommodated in an annular accommodation space formed therebetween. One of two ends of the flat cable is fixed to the fixed-side member and is connected to a connector, and the other end of the flat cable is fixed to the rotatable-side member and is connected to a connector. An intermediate part of the flat cable in a longitudinal direction thereof is a folded part that is curved and folded. Owing to this structure, regardless of whether the direction in which the rotatable-side member is rotated is clockwise or counterclockwise, the flat cable is wound and rewound with resilience, which allows signal transmission.

In the case where such a rotatable connector device is used for multiple high-speed communication of a CAN (Controller Area Network) or the like, there are problems that the electromagnetic compatibility is decreased due to electromagnetic noise and that the impedance is unstabilized.

In order to improve the electromagnetic compatibility, Patent Document 1 proposes a flat cable having a twisted pair structure, which is obtained as follows. A flat cable including a pair of signal conductors is folded along many folding lines which are parallel to each other and angled with respect to a width direction thereof.

However, the twisted pair structure spoils the resilience of the flat cable and thus inhibits smooth rotation of the rotatable-side member.

In order to decrease the noise and solve the problem of unstable impedance, a method for applying a shield layer to a flat cable including a signal transmission path has been proposed (see Patent Document 2).

According to one specific method therefor, a shield conductor and a signal conductor acting as a signal transmission path are provided in one covered cable. However, this method has the following problem. Usually, a flat cable is formed of two, namely, top and bottom, resin laminate films by thermally fusing adhesive layers attached thereto. Therefore, it is difficult to accurately keep the distance between the signal conductor and the shield conductor. In addition, sliding or curving of the flat cable that accompanies the rotation of the rotatable-side member causes buckling or abrasion. This results in a shield layer of the shield conductor being delaminated or cracked, which decreases the electromagnetic compatibility due to electromagnetic noise and unstabilizes the impedance.

In order to solve these problems, it is conceivable to provide a spacer sheet between the signal conductor and the shield conductor so as to fuse and connect these conductors while an appropriate distance is kept therebetween. However, this is not preferable because it is difficult to keep the adhesiveness between the spacer and the conductors, and also because the use of the spacer raises the cost.

It is also conceivable to attach a conductive material to an outer surface of the flat cable including the signal conductor by use of electroless plating or the like. However, this method has an undesirable possibility that sliding or bending of the flat cable causes bucking or abrasion, which causes the conductive material to be delaminated or cracked.

CITATION LIST

Patent Literature

Patent Document 1: Japanese Laid-Open Patent Publication No. 2009-104907
Patent Document 2: WO2011/136008

SUMMARY OF INVENTION

Technical Problem

The present invention has an object of providing a rotatable connector device that has EMC improved to a required level and thus is usable for multiple high-speed communication.

Solution to Problem

The present invention is directed to a rotatable connector device including a fixed-side member; a rotatable-side member rotatably attached to the fixed-side member; and a flat cable accommodated in an annular accommodation space defined by the fixed-side member and the rotatable-side member; wherein: the flat cable includes a signal flat cable including a pair of signal conductors and a band-like resin covering the pair of signal conductors and also includes a dummy flat cable that is provided on at least one of a front surface and a rear surface of the signal flat cable and is formed of a band-like resin not including a conductor, the signal flat cable and the dummy flat cable being stacked on each other; the flat cable further includes adhering means that causes the signal flat cable and the dummy flat cable stacked on each other to adhere to each other; and a conductor interval between the pair of signal conductors is set to smaller than, or equivalent to, a conductor width of each of the pair of signal conductors.

The rotatable connector device may be an SRC attached to a steering part in an automobile, or a connector device in a mechanism including a rotatable part of a robot arm or the like.

The flat cable, the signal flat cable and the dummy flat cable described above may be a band-like cable formed of two resin laminate films by thermally fusing adhesive layers attached thereto.

The dummy flat cable formed of the band-like resin not including a conductor may be formed of only two resin laminate films. The signal flat cable may include only a signal conductor or may include a signal conductor and a circuit conductor.

The adhering means may be formed of, for example, a grease or the like that has an improved viscosity and thus can prevent the signal flat cable and the dummy flat cable in the adhering state from being inadvertently separated from each other.

The conductor interval between the pair of signal conductors is set to smaller than, or equivalent to, the conductor width of each of the pair of signal conductors. The expression "smaller than, or equivalent to" may represent a concept encompassing a range smaller than, or equal to, the conductor width and also a range greater than the conductor width by a level of error.

According to the present invention, the EMC can be improved stably. Therefore, the rotatable connector device has EMC improved to a required level and thus is usable for multiple high-speed communication.

This will be described in more detail. In the annular accommodation space defined by the fixed-side member and the rotatable-side member rotatably attached to the fixed-side member, the flat cable is accommodated. The flat cable includes the signal flat cable and the dummy flat cable stacked on each other. The signal flat cable includes a pair of signal conductors which are covered with a band-like resin. The dummy flat cable is provided on at least one of the front and rear surfaces of the signal flat cable and is formed of a band-like resin not including a conductor. The flat cable further includes adhering means that causes the signal flat cable and the dummy flat cable stacked on each other to adhere to each other. Owing to this structure, the rotatable-side member can be smoothly rotated without the resilience of the flat cable being spoiled. In addition, sliding or curving of the flat cable that accompanies the rotation of the rotatable-side member does not cause buckling or abrasion. Therefore, the electromagnetic compatibility is not decreased by the electromagnetic noise, and thus the impedance can be stabilized.

The signal flat cable and the dummy flat cable are stacked on each other and adhere to each other. Therefore, in the state where the flat cable is in the form of a plurality of winds, an accurate distance can be kept between the signal conductors.

This will be described in more detail. The impedance is a differential impedance, namely, a difference in the impedance between the two signal conductors and a ground conductor acting as a ground line. Therefore, the distance between the ground conductor and the signal conductors can be provided by the dummy flat cable with certainty. In addition, another conductor which may be an element of the ground line is isolated by the dummy flat cable. Therefore, the impedance can be stabilized.

The conductor interval between the pair of signal conductors is set to smaller than, or equivalent to, the conductor width of each of the signal conductors. Therefore, even when the rotatable-side member rotates with respect to the fixed-side member, the electromagnetic compatibility is not decreased by the magnetic noise and thus the impedance can be stabilized.

Thus, the EMC of the rotatable connector device is improved stably. The rotatable connector device has EMC improved to a required level and thus is usable for multiple high-speed communication.

In an embodiment of the present invention, the conductor interval between the pair of signal conductors may be set to at least ten times a thickness of each of the pair of signal conductors.

According to the present invention, the impedance can be more stabilized.

This will be described in more detail. The conductors are extremely thin as compared with the conductor width. Therefore, the influence of the electrostatic coupling between the conductors exerted on the impedance is relatively small. However, when the conductors are close to each other, the amount of the electrostatic coupling is increased, which may slightly influence the impedance. Therefore, the lower limit of the conductor interval is set to ten times the thickness of each conductor, so that the electromagnetic compatibility is not decreased by the electromagnetic noise and thus the impedance can be stabilized.

In an embodiment of the present invention, the rotatable-side member may be rotatable with respect to a rotation axis thereof in both of two rotation directions; the accommodation space may accommodate an annular freely movable member having a roller provided on a top surface thereof; a part of the flat cable in a longitudinal direction thereof may include a folded part that is curved and folded by the roller; and the flat cable may be retained on the freely movable member.

According to the present invention, the impedance can be still more stabilized.

This will be described in more detail. In a rotatable connector device, the electrical resistance or the weight of the conductors is decreased. Therefore, it is preferable that the flat cable is shorter. Thus, a so-called roller U-turn-type rotatable connector device is generally used in which a part of the flat cable includes a folded part that is curved in a U shape as seen in a plan view and the folded part is hooked along the roller.

However, when the roller is, for example, pulled by the flat cable including the signal conductors, the reliability may be declined.

As described above, in a rotatable connector including a flat cable accommodated therein, when the rotatable-side member is rotated, the flat cable is wound and rewound along with the rotation. At this point, the state in which the flat cable is accommodated in the form of a plurality of winds is changed in accordance with the rotation angle or the rotation rate of the rotatable-side member. This may vary the impedance on the signal source side and the load side, between which the impedance needs to be matched. Nonetheless, the above-described structure can stabilize the impedance.

In an embodiment of the present invention, the flat cable may further include, in addition to the signal flat cable and the dummy flat cable, another dummy flat cable and a circuit conductor flat cable including a circuit conductor that forms a circuit; and one of the two dummy flat cables may be provided between the signal flat cable and the circuit conductor flat cable, and the other dummy flat cable may be provided on the signal flat cable on the side opposite to the side on which the circuit conductor flat cable is provided.

According to the present invention, in the state where the flat cable is accommodated in the accommodation space in the form of a plurality of winds, the dummy flat cable is necessarily present between the circuit conductor flat cable including the circuit conductor that forms a circuit and the signal flat cable. Therefore, the electromagnetic compatibility is not decreased by the electromagnetic noise caused by a current flowing in the circuit conductor in the circuit conductor flat cable, and thus the impedance can be stabilized.

Advantageous Effects of Invention

According to the present invention, a rotatable connector device that has EMC improved to a required level and thus is usable for multiplex high-speed communication is provided.

DESCRIPTION OF EMBODIMENTS

Hereinafter, an embodiment of the present invention will be described with reference to the drawings.

Figure 1:
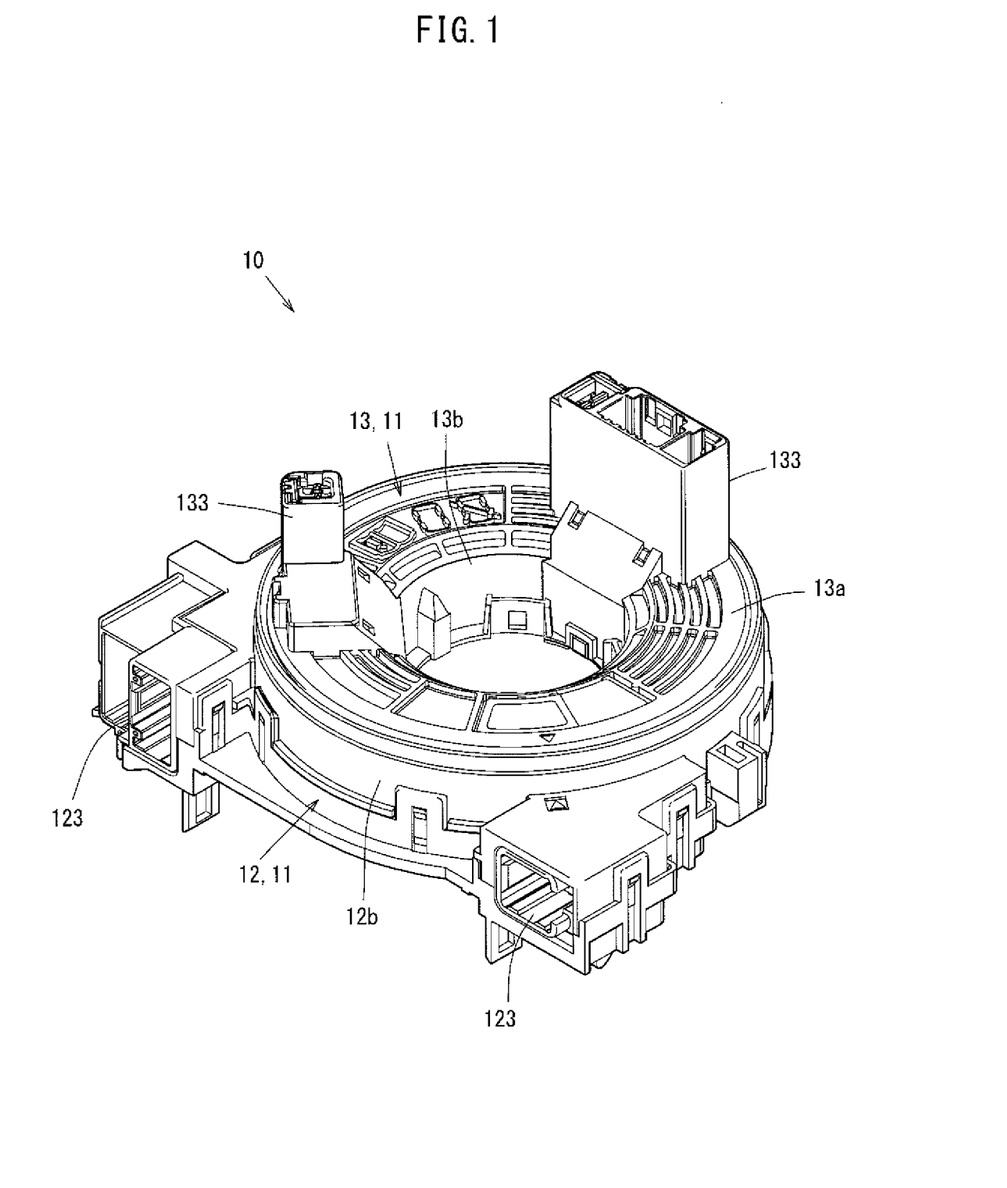
FIG. 1 is an external view of a steering roll connector.
Figure 2:
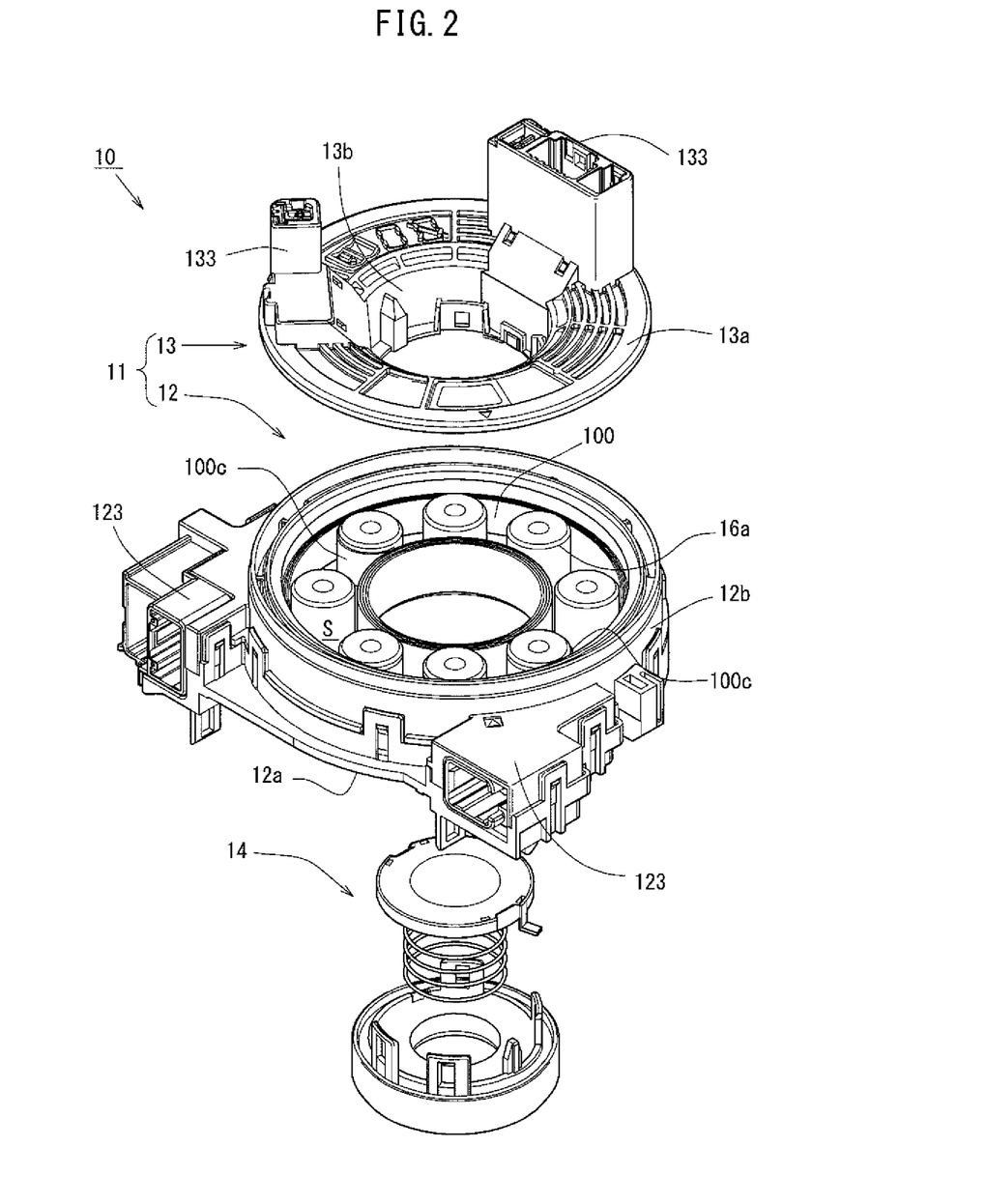
FIG. 2 is an exploded isometric view of the steering roll connector.
Figure 3:
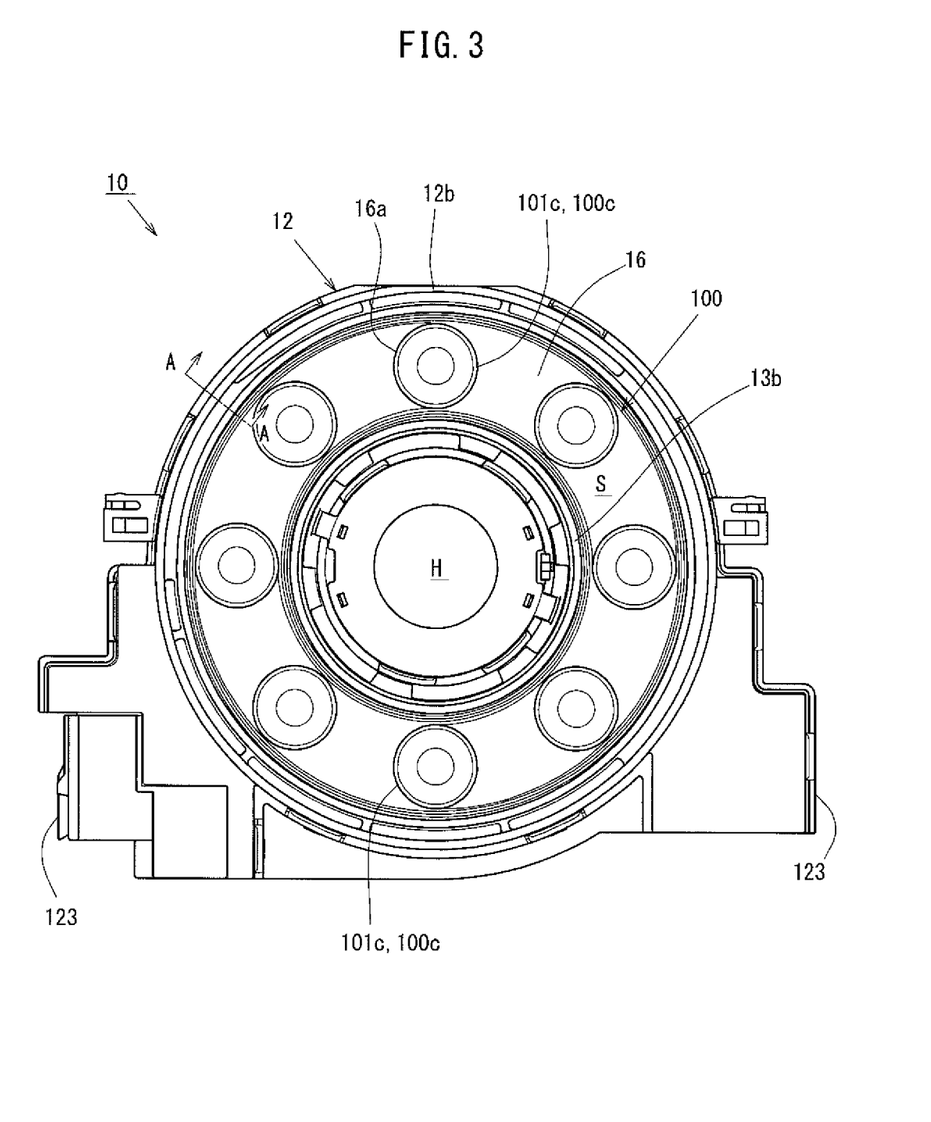
FIG. 3 is a plan view showing the steering roll connector in the state where a rotator is detached.
Figure 4:
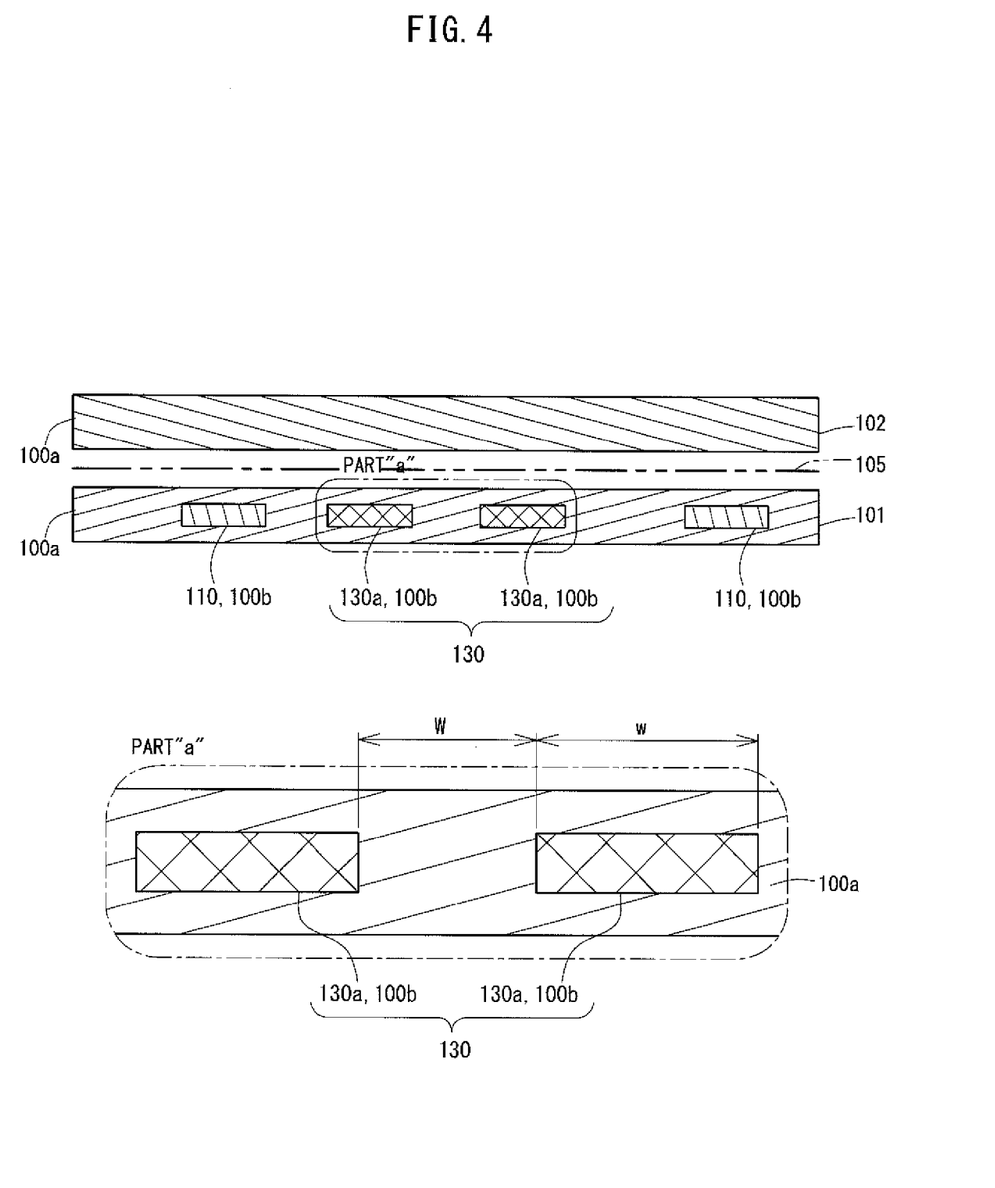
FIG. 4 is a conceptual view showing a structure of a stack-type cable.
Figure 5:
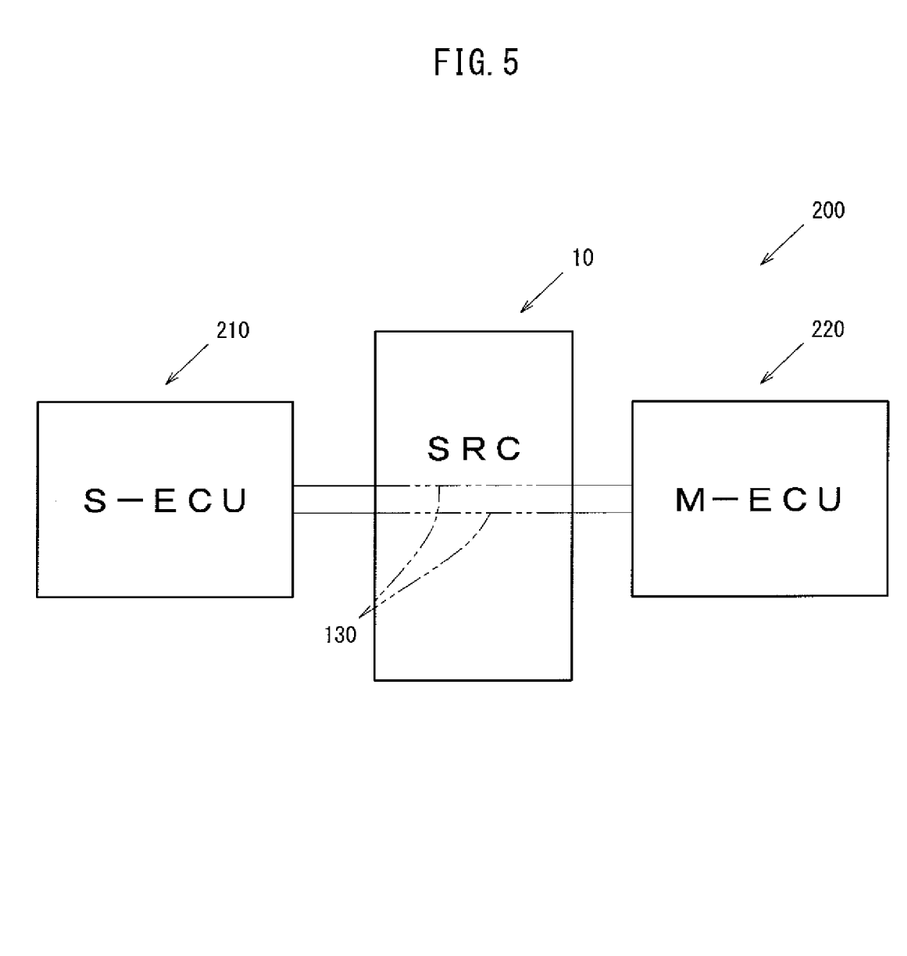
FIG. 5 is a conceptual view of a communication circuit including the steering roll connector.
Figure 6:
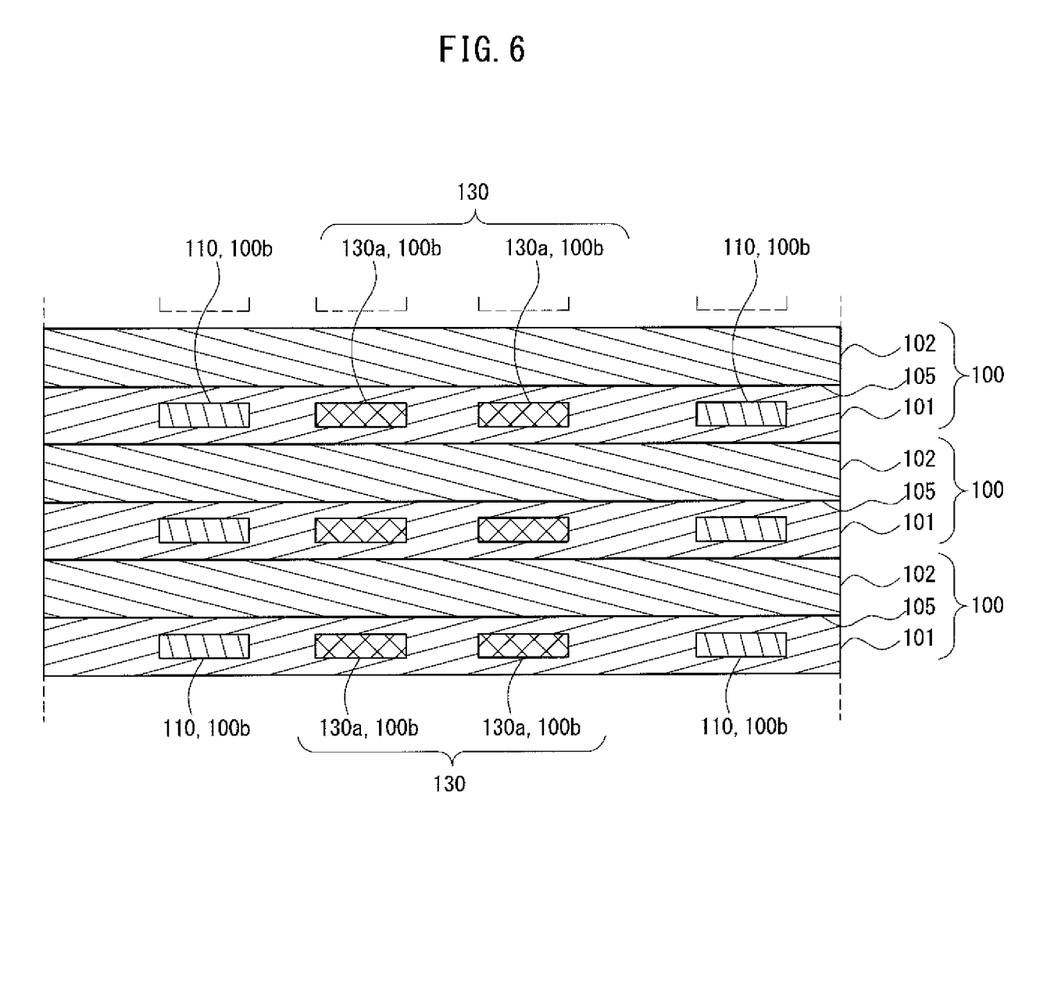
FIG. 6 is a conceptual cross-sectional view of the stack-type cable taken along line A-A in FIG. 3.

FIG. 1 is an external view of a steering roll connector 10 (hereinafter, referred to as the "SRC 10"). FIG. 2 is an exploded isometric view of the SRC 10. FIG. 3 is a plan view of the SRC 10 in the state where a rotator 13 is detached. FIG. 4 is a conceptual view showing a structure of a flat cable. FIG. 5 is a conceptual view of a transmission path 200 including the SRC 10. FIG. 6 is a conceptual cross-sectional view of the stack-type cable 100 taken along line A-A in FIG. 3.

The SRC 10 controls electric components provided in a steering wheel (not shown). As shown in FIG. 5, the SRC 10 forms the transmission path 200 that transmits electrical signals between a steering ECU 210 (hereinafter, referred to as the "S-ECU 210") provided in the steering wheel and a main ECU 220 (hereinafter, referred to as the "M-ECU 220") provided on a vehicle main body side. The SRC 10 also forms other conductive circuits (not shown).

As shown in FIG. 1 through FIG. 3, the SRC 10, which forms the transmission path 200 between the S-ECU 210 and the M-ECU 220 and also other conductive circuits, includes a cable housing 11 that accommodates the stack-type cables 100, and a rotation lock unit 14 that locks a stator 12 and the rotator 13 such that the stator 12 and the rotator 13 are not rotated with respect to each other. The stator 12 and the rotator 13 are parts of the cable housing 11.

The cable housing 11 has a generally cylindrical shape and has an insertion hole H formed at a central part thereof as seen in a plan view thereof. The insertion hole H allows a steering shaft (not shown) to run through the cable housing 11 in an axial direction thereof. The insertion hole H has such a diameter that allows the steering shaft supported by a steering column (not shown) to be inserted into the insertion hole H.

The SRC 10 is accommodated in the steering column (not shown) that is located on the vehicle body side with respect to the steering wheel (not shown), and the steering wheel that makes a rotation operation is fixed to a top end of the steering shaft passing through the insertion hole H.

The cable housing 11 includes the stator 12 and the rotator 13 that are engaged with each other so as to be rotatable with respect to each other.

The stator 12 includes an annular fixed-side ring plate 12a acting as a bottom plate and an outer circumferential cylindrical part 12b having a cylindrical shape and extending vertically from an outer circumferential edge of the fixed-side ring plate 12a. The outer circumferential edge of the fixed-side ring plate 12a and a bottom edge of the outer circumferential cylindrical part 12b are engaged with each other, and thus the stator 12 and the rotator 13 are integrated together.

The stator 12 having such a structure is fixed to an appropriate member on the vehicle body side, for example, a combination bracket switch (not shown) located in the steering column.

The outer circumferential cylindrical part 12b of the stator 12 has a diameter larger than that of the rotator 13 described later.

On the fixed-side ring plate 12a of the stator 12, a retainer 16 that is ring-shaped as seen in a plan view is rotatably located. On a top surface of the retainer 16, rollers 16a are located at a generally equal interval in a circumferential direction.

The stator 12 also includes fixed-side connectors 123.

The rotator 13 includes an annular rotatable-side ring plate 13a and an inner circumferential cylindrical part 13b having a cylindrical shape and extending vertically from an inner circumferential edge of the rotatable-side ring plate 13b. The rotator 13 is rotatable integrally with the steering wheel. Therefore, the rotator 13 can rotate with respect to the stator 12 around an axis which is the same as a rotation axis of the steering wheel.

The rotatable-side ring plate 13a is located to face the fixed-side ring plate 12 in a rotation axial direction of the rotator 13.

The rotation axial direction of the rotator 13 is the same as the axial direction of the above-described steering wheel (up-down direction in FIG. 1 and FIG. 2).

The inner circumferential cylindrical part 13b is located to face the outer circumferential cylindrical part 12h in a radial direction. The rotator 13 also includes rotatable-side connectors 133.

The cable housing 11 has a combination of the stator 12 and the rotator 13 structured as described above. As shown in FIG. 2, an annular accommodation space S is defined by the cable housing 11, more specifically, is defined by the fixed-side ring plate 12a and the outer circumferential cylindrical part 12b of the stator 12 and the rotatable-side ring plate 13a and the inner circumferential cylindrical part 13b of the rotator 13. The accommodation space S accommodates the stack-type cables 100 and the retainer 16 that retains the stack-type cables 100. The stack-type cables 100 each include a plurality of cables stacked on each other and are accommodated in the form of a plurality of winds.

Each of the stack-type cables 100 accommodated in the accommodation space S includes a dummy flat cable 102 (hereinafter, referred to as the "dummy FC 102") and a transmission path flat cable 101 (hereinafter, referred to as the "transmission path FC 101"), which are stacked in this order from a diametrically outer side (top side in FIG. 4) to a diametrically inner side (bottom side in FIG. 4) in the state where the stack-type cable 100 is accommodated in the accommodation space S in the form of a plurality of winds. In FIG. 4, the thickness of the stack-type cable 100 is shown larger with respect to the width thereof (left-right direction in FIG. 4) than the actual thickness with respect to the width, for easier understanding of the structure of the stack-type cable 100.

The dummy FC 102 and the transmission path FC 101 have the same width as each other. The dummy FC 102 is formed of two laminate sheets 100a bonded together. The transmission path FC 101 includes a plurality of copper alloy thin flat rectangular conductors 100b that have an appropriate width and are located at an appropriate interval, and the insulating laminate sheets 100a that sandwich the flat rectangular conductors 100b from front and rear sides thereof. Thus, the flat rectangular conductors 100b and the insulating laminate sheets 100a are integrated together.

The structure of the transmission path FC 101 will be described in more detail. The flat rectangular conductors 100b included in the transmission path FC 101 and located at an appropriate interval in the width direction (left-right direction in FIG. 4) are, from the left in FIG. 4, a circuit conductor 110 forming a conductor circuit, a transmission path conductor pair 130 formed of two transmission path conductors 130a, and another circuit conductor 110. These conductors 100b are sandwiched by the insulating laminate sheets 100a from the front and rear sides thereof to be integrated with the insulating laminate sheets 100a.

Namely, the circuit conductors 110 are located outer in the width direction to the transmission path conductor pair 130.

In the transmission path FC 101, as shown in an enlarged view of part "a" in FIG. 4, the two transmission path conductors 130a forming the transmission path conductor pair 130 face each other while having a width-direction interval W therebetween, and the interval W is smaller than a conductor width w of each of the transmission path conductors 130a.

The stack-type cables 100 each having such a structure are accommodated in the accommodation space S in the form of plurality of winds, and electrically connect the rotatable-side connectors 133 and the fixed-side connectors 123 describe above to each other.

The rotatable-side connectors 123 are respectively connected to the rotatable-side connectors 133 via the transmission path FCs 101 each including the transmission path pair 130. Each rotatable-side connector 123 is connected to a cable (not shown) drawn from a conductive circuit or the like on the vehicle body side in the steering column (not shown). Each rotatable-side connector 133 is connected to a cable (not shown) drawn from a conductive circuit of, for example, a horn switch, an airbag unit or the like in the steering wheel (not shown).

As described above, the transmission path conductor pair 130 connected to the M-ECU 220 via the corresponding fixed-side connector 123 and connected to the S-ECU 220 via the corresponding rotatable-side connector 133 can perform CAN communication, which is a dual-wire differential voltage system.

This will be described in more detail. The CAN communication is a system of transmitting data based on whether there is a voltage difference between the transmission path conductors 130a of the transmission path conductor pair 130. In the case where the CAN communication is performed, the differential voltage between the conductors does not change even when the transmission path conductor pair 130 is contaminated with electromagnetic noise from outside. Therefore, the transmission path conductor pair 130 is not easily influenced by the electromagnetic noise and thus can transmit signal data accurately.

As described above, the transmission path FC 101 includes the transmission path conductor pair 130 and thus can perform the CAN communication. Alternatively, the transmission path FC 101 may use LIN (Local Interconnect Network) or FlexRay communication. The transmission path conductor pair 130 may use a communication system suitable to the target of control, which is, for example, a power train system such as an engine or the like, or a driving operation system such as a steering wheel, a brake, a throttle or the like.

As described above, each stack-type cable 100 has a stack of the transmission path FC 101 including the transmission path conductor pair 130 usable for the CAN communication and the dummy FC 102. An inner end of the stack-type cable 100 is fixed to the inner circumferential cylindrical part 13b, whereas an outer end thereof is fixed to the outer circumferential cylindrical part 12b. An inner end part of the stack-type cable 100 is wound along the inner circumferential cylindrical part 13b in one direction, whereas an outer end part thereof is wound along an inner surface of the outer circumferential cylindrical part 12b in a direction opposite to the one direction. An intermediate part of the stack-type cable 100 is retained on the retainer 16 and wound along the rollers 16a while being inverted in a U-shape. Thus, U-turn parts 100c that move along with the rotation of the rotator 13 are formed. Each stack-type cable 100 is accommodated in the accommodation space S in this state.

This will be described in more detail. The outer end of the transmission path FC 101 included in the stack-type cable 100 is fixed to the outer circumferential cylindrical part 12b, and the transmission path conductor pair 130 and the circuit conductors 110 of the transmission path FC 101 are connected to the corresponding fixed-side connector 123. The inner end of the transmission path FC 101 is fixed to the inner circumferential cylindrical part 13b, and the transmission path conductor pair 130 and the circuit conductors 110 of the transmission path FC 101 are connected to the corresponding rotatable-side connector 133.

The winding direction of the cable 101 and the cable 102 of each stacked-type cable 100 is inverted at the U-turn parts 100c (101c) of the cable 101 and the U-turn parts 100c (102c) of the cable 102. Such U-turn parts 100c are in the intermediate part of the cables 101 and 102, and are located in the accommodation space S at an equal interval in the circumferential direction.

Surfaces of the cables 101 and 102 of the stack-type cable 101 along which the cables 101 and 102 face each other and outer surfaces of the cables 101 and 102 are coated with a grease 105 represented by phantom line in FIG. 4 to improve the adhesiveness between the cables 101 and 102. This allows the cables 101 and 102 of the stack-type cable 100 to adhere to each other and prevents the cables 101 and 102 from being inadvertently separated from each other in the state where the stack-type cable 100 is accommodated in the accommodated space S in the form of a plurality of winds.

Each stack-type cable 100 has the above-described structure. Therefore, in the state where the stack-type cable 100 is accommodated in the accommodation space S in the form of a plurality of winds, the dummy FC 102 is located outer and/or inner, in the diametrical direction, to the transmission path FC 101 including the transmission path conductor pair 130 as shown in FIG. 6. Therefore, portions of the transmission path conductor pair 130 that are stacked in the diametrical direction in the winding state have the dummy CC 102 therebetween.

The dummy FC 102 can keep an appropriate distance between the portions of the transmission path conductor pair 130 of the transmission path FC 101 that are stacked in the diametrical direction in the winding state.

As described above, the portions of the transmission path conductor pair 130 that are stacked in the diametrical direction in the winding state can be kept distanced from each other by an accurate interval by the dummy FC 102. Therefore, electrical interference that would have been otherwise caused by the electromagnetic noise between the portions of the transmission path conductor pair 130 that are stacked in the diametrical direction in the winding state is prevented, and the impedance in the transmission path conductors 130a can be stabilized. As a result, electrical signals can be transmitted between the S-ECU 210 and the M-ECU 220 with certainty as required.

This will be described in more detail. In the annular accommodation space S defined by the stator 12 and the rotator 13 rotatably attached to the stator 12, the stack-type cables 100 are accommodated. Each stack-type cable 100 includes the transmission path FC 101 and the dummy FC 102 stacked on each other. The transmission path FC 101 includes a pair of transmission path conductors 130a which are covered with the laminate sheets 100a. The dummy FC 102 is provided on the front surface of the transmission path EC 101 and is formed of the laminate sheets 100a not including a conductor.

The stack-type cable 100 further includes the grease 105 that causes the transmission path FC 102 and the dummy FC 102 stacked on each other to adhere to each other and also prevents the transmission path FC 102 and the dummy FC 102 in an adhering state from being separated from each other. Owing to this structure, the rotator 13 can be smoothly rotated without the resilience of the stack-type cable 100 being spoiled. In addition, sliding or curving of the stack-type cable 100 that accompanies the rotation of the rotator 13 does not cause buckling or abrasion. Therefore, the electromagnetic compatibility is not decreased by the electromagnetic noise, and thus the impedance can be stabilized.

Since the transmission path FC 101 and the dummy FC 102 are stacked on each other and adhere to each other, the distance between the portions of the transmission path conductor pair 130 that are stacked in the diametrical direction in the winding state can be kept accurately.

This will be described in more detail. The impedance (Z) is calculated by expression 1 below.

In expression 1, Ls represents the inductance and Cs represents the electrical capacitance.

$$Z = \sqrt{\frac{Ls}{Cs}}$$ [Expression 1]

When the rotator 13 rotates with respect to the stator 12, the state in which each stack-type cable 100 is accommodated in the form of a plurality of winds is changed. If the transmission path FC 101 and the dummy FC 102 included in each stack-type cable 100 are separated or made close to each other in this case, Ls and Cs in expression 1 above are varied, which unstabilizes the impedance (Z).

By contrast, in this embodiment, the transmission path FC 101 and the dummy FC 102 of the stack-type cable 100 in the SRC 10 are kept adhering to each other by the grease 105. Therefore, the transmission path FC 101 and the dummy FC 102 are prevented from being separated from each other even when the state of the stack-type cable 100 accommodated in the form of a plurality of winds is changed along with the rotation of the rotator 13 with respect to the stator 12. Thus, Ls and Cs in expression 1 above are stabilized, which also stabilizes the impedance (Z).

The transmission path FC 101 and the dummy FC 102 of the stack-type cable 100 adhere to each other by the grease 105. Nonetheless, the transmission path FC 101 and the dummy FC 102 merely appear as being integrated because of the improved viscosity provided by the grease 105. The transmission path FC 101 and the dummy FC 102 can slide with respect to each other in a longitudinal direction thereof. Therefore, no extra load is applied to the transmission path FC 101 or the dummy FC 102 even though there is a difference in the radius of curvature of the winding part between the side of the stator 12 and on the side of the rotator 13. Therefore, the rotator 13 can smoothly rotate with respect to the stator 12.

The width-direction interval W between the pair of transmission path conductors 130a is set to smaller than, or equivalent to, the conductor width w of each of the transmission path conductors 130a. Therefore, even when the state of the stack-type cable 100 accommodated in the accommodation space S in the form of a plurality of winds is changed along with the rotation of the rotator 12 with respect to the stator 12, the electromagnetic compatibility is not decreased by the electromagnetic noise, and thus the impedance (Z) can be stabilized.

This improves the EMC of the rotatable connector device stably. The rotatable connector device has a required level of EMC and thus can perform multiple high-speed communication.

The rotator 13 is rotatable in both of two directions with respect to the rotation axis. The annular retainer 16 having the rollers 16a provided on the top surface thereof is located in the accommodation space S. Each stack-type cable 100 includes, in a part thereof in the longitudinal direction, the U-turn parts 100c at which the stack-type cable 100 is curved and folded by the rollers 16a. The stack-type cable 100 is retained on the retainer 16. Owing to this structure, even when the stack-type cable 100 is wound and rewound along with the rotation of the rotator 13 and the state of the stack-type cable 100 accommodated in the form of a plurality of winds is changed in accordance with the rotation angle or the rotation rate of the rotator 13, the impedance can be stabilized both on the signal source side and the load side, between which the impedance needs to be matched.

As described above, the width-direction interval W between the pair of transmission path conductors 130a is set to smaller than, or equivalent to, the conductor width w of each of the transmission path conductors 130a. Owing to this, the electromagnetic compatibility is not decreased by the electromagnetic noise, and thus the impedance (Z) can be stabilized. Among the above-described effects of the SRC 10, this effect was confirmed by an effect confirming experiment. Hereinafter, the effect confirming experiment will be described.

The experiment was performed as follows. The stack-type cables 100 including two types of transmission path FCs 101 were used. In one type of transmission path FC 101, the transmission path conductors 130a of the transmission path pair 130 each had a conductor width w of 0.8 mm. In the other type of transmission path FC 101, the transmission path conductors 130a of the transmission path pair 130 each had a conductor width w of 1.6 mm. The width-direction interval W between the pair of transmission path conductors 130a was a parameter. The impedance (Z) when the SRC 10 was rotated was measured. Thus, the influence of the width-direction interval W exerted on the conductor width w was examined.

In this test, the transmission path conductors 130a each had a thickness of 35 μm. The communication frequency was 1 MHz in accordance with the standards of the CAN communication. A test sample having an impedance outside the range from "120Ω−25Ω" to "120Ω+20Ω" was evaluated as being not good.

Table 1 shows the results obtained when the transmission path conductors 130a having a conductor width w of 0.8 mm were located at the width-direction interval W of 0.6 mm, 0.8 mm, 1.0 mm, 1.2 mm and 1.4 mm. The "rotation angle" is a counterclockwise or clockwise rotation angle from a center position in the rotation direction. The impedance at each rotation angle was measured.

TABLE 1

| w = 0.8 Rotation angle (deg) | | W = 0.6 Z (ohm) | W = 0.8 Z (ohm) | W = 1.0 Z (ohm) | W = 1.2 Z (ohm) | W = 1.4 Z (ohm) |
|---|---|---|---|---|---|---|
| Counter-clockwise | 900 | 116.5 | 114.2 | 116.8 | 128.4 | 143.4 |
| | 810 | 117.6 | 114.3 | 117.0 | 128.4 | 144.6 |
| | 720 | 118.1 | 113.9 | 116.8 | 127.9 | 144.3 |
| | 630 | 119.4 | 114.5 | 117.2 | 127.5 | 144.2 |
| | 540 | 122.2 | 115.8 | 118.7 | 128.5 | 144.4 |
| | 450 | 121.6 | 115.4 | 119.5 | 129.5 | 144.1 |
| | 360 | 121.9 | 115.5 | 121.8 | 131.1 | 146.4 |
| | 270 | 120.6 | 115.1 | 122.7 | 131.4 | 146.9 |

TABLE 1-continued

| w = 0.8 Rotation angle (deg) | | W = 0.6 Z (ohm) | W = 0.8 Z (ohm) | W = 1.0 Z (ohm) | W = 1.2 Z (ohm) | W = 1.4 Z (ohm) |
|---|---|---|---|---|---|---|
| | 180 | 119.1 | 116.3 | 122.5 | 132.1 | 144.8 |
| | 90 | 118.2 | 117.7 | 122.6 | 134.5 | 141.8 |
| Center | 0 | 117.9 | 119.7 | 123.4 | 134.5 | 140.6 |
| Clockwise | 90 | 117.3 | 123.3 | 124.9 | 133.5 | 139.4 |
| | 180 | 116.6 | 124.5 | 125.8 | 136.5 | 139.8 |
| | 270 | 116.9 | 128.6 | 128.9 | 137.3 | 139.4 |
| | 360 | 116.7 | 132.9 | 132.5 | 138.0 | 139.3 |
| | 450 | 116.7 | 136.8 | 136.5 | 139.3 | 139.8 |
| | 540 | 116.3 | 139.3 | 138.3 | 138.9 | 139.9 |
| | 630 | 115.6 | 136.2 | 142.0 | 140.8 | 139.9 |
| | 720 | 115.6 | 135.5 | 142.6 | 145.1 | 139.2 |
| | 810 | 115.9 | 134.3 | 135.6 | 142.6 | 139.1 |
| | 900 | 116.0 | 132.3 | 135.0 | 139.6 | 138.3 |

From the test results shown in Table 1, the following was confirmed. When the width-direction interval W is larger than the conductor width w (0.8 mm), namely, when the width-direction interval W is 1.0 mm, 1.2 mm and 1.4 mm, the impedance exceeds the upper limit of the standards of the CAN communication, namely, 120+20 (Ω) at some of the rotation angles. By contrast, when the width-direction interval W is smaller than, or equivalent to, the conductor width w (0.8 mm), namely, when the width-direction interval W is 0.6 mm and 0.8 mm, the impedance is within the above-described range at all the rotation angles.

Table 2 shows the results obtained when the transmission path conductors 130a having a conductor width w of 1.6 mm were located at the width-direction interval W of 1.0 mm, 1.4 mm, 1.6 mm, 1.8 mm and 2.0 mm.

TABLE 2

| w = 1.6 Rotation angle (deg) | | W = 1.0 Z (ohm) | W = 1.4 Z (ohm) | W = 1.6 Z (ohm) | W = 1.8 Z (ohm) | W = 2.0 Z (ohm) |
|---|---|---|---|---|---|---|
| Counter- | 900 | 113.0 | 122.3 | 127.8 | 153.7 | 153.7 |
| clockwise | 810 | 111.3 | 121.9 | 128.4 | 151.3 | 151.3 |
| | 720 | 109.8 | 122.0 | 127.9 | 148.9 | 148.9 |
| | 630 | 108.3 | 117.5 | 128.2 | 147.1 | 147.1 |
| | 540 | 107.2 | 116.7 | 127.5 | 145.6 | 145.6 |
| | 450 | 106.0 | 115.8 | 126.2 | 142.8 | 142.8 |
| | 360 | 105.0 | 115.1 | 124.6 | 140.3 | 140.3 |
| | 270 | 104.4 | 109.8 | 124.0 | 139.8 | 139.8 |
| | 180 | 104.2 | 108.9 | 123.8 | 140.1 | 140.1 |
| | 90 | 104.2 | 108.2 | 123.5 | 140.4 | 140.4 |
| Center | 0 | 104.6 | 107.7 | 123.8 | 140.2 | 140.2 |
| Clockwise | 90 | 106.1 | 118.7 | 125.2 | 141.6 | 141.6 |
| | 180 | 107.9 | 114.3 | 126.3 | 142.7 | 142.7 |
| | 270 | 108.3 | 117.4 | 127.3 | 142.8 | 142.8 |
| | 360 | 107.9 | 117.8 | 127.8 | 142.1 | 142.1 |
| | 450 | 108.3 | 118.1 | 127.4 | 141.4 | 141.4 |
| | 540 | 109.4 | 118.1 | 125.9 | 139.9 | 139.9 |
| | 630 | 112.6 | 121.0 | 127.9 | 140.1 | 140.1 |
| | 720 | 115.6 | 123.4 | 130.1 | 141.4 | 141.4 |
| | 810 | 116.9 | 124.7 | 131.5 | 144.9 | 144.9 |
| | 900 | 117.8 | 124.9 | 132.8 | 147.3 | 147.3 |

From the test results shown in Table 2, the following was confirmed. When the width-direction interval W is larger than the conductor width w (1.6 mm), namely, when the width-direction interval W is 1.8 mm and 2.0 mm, the impedance exceeds the upper limit of the standards of the CAN communication, namely, 120+20 (Ω) at almost all the rotation angles. By contrast, when the width-direction interval W is smaller than, or equivalent to, the conductor width w (1.6 ram), namely, when the width-direction interval W is 1.0 mm, 1.4 mm and 1.6 mm, the impedance is within the above-described range at all the rotation angles.

From the results of the effect confirming experiment, it was confirmed that in the case where the width-direction interval W between the pair of transmission path conductors 130a is set to smaller than, or equivalent to, the conductor width w of each transmission path conductor 130a, the electromagnetic compatibility is not decreased by the electromagnetic noise and thus the impedance can be stabilized.

The flat rectangular conductors 100b each have a thickness of 0.035 mm (35 μm). Therefore, as long as the width-direction interval W between the pair of transmission path conductors 130a is at least 0.35 mm, which is ten times the thickness of each flat rectangular conductor 100b, the electromagnetic compatibility is not decreased by the electromagnetic noise and thus the impedance can be stabilized.

This will be described in more detail. The flat rectangular conductors 100b are extremely thin as compared with the conductor width w. Therefore, the influence of the electrostatic coupling between the conductors exerted on the impedance is relatively small. However, when the conductors are close to each other, the amount of the electrostatic coupling is increased, which slightly influences the impedance. Therefore, the lower limit of the width-direction interval W is set to 0.35 mm, which is ten times the thickness of each conductor 130a, so that the electromagnetic compatibility is not decreased by the electromagnetic noise and thus the impedance can be stabilized.

The electrostatic coupling between the transmission path conductor 130a and the circuit conductor 110 adjacent to each other does not much influence either on the impedance because the rectangular conductors 100b are extremely thin. Nonetheless, it is preferable that a width-direction interval W between the transmission path conductor 130a and the circuit conductor 110 adjacent to each other is at least equal to a width w of the circuit conductor 110, at which the influence is completely eliminated.

As described above, the width-direction interval W between the pair of transmission path conductors 130a is set to smaller than, or equivalent to, the conductor width w of each flat rectangular conductor 110b and at least ten times the thickness of each flat rectangular conductor 110b; and the interval in the width direction between the transmission path conductor 130a and the circuit conductor 110 adjacent to each other is larger than, or equivalent to, the width w of each circuit conductor 110. In this manner, the impedance can be stabilized with more certainty.

In the above description, each stack-type cable 100 includes the transmission path FC 101 and the dummy FC 102 provided on the front surface of the transmission path FC 101 and is accommodated in the accommodation space S in the form of a plurality of winds. Alternatively, the dummy FC 102 may be provided on the rear surface of the transmission path FC 101, or on both of the front surface and the rear surface of the transmission path FC 101.

In the above description, each stack-type cable 100 includes the transmission path FC 101 and the dummy FC 102. Alternatively, each stack-type cable 100 may include a plurality of transmission path FCs 101 and dummy FCs 102 stacked alternately.

Figure 7:
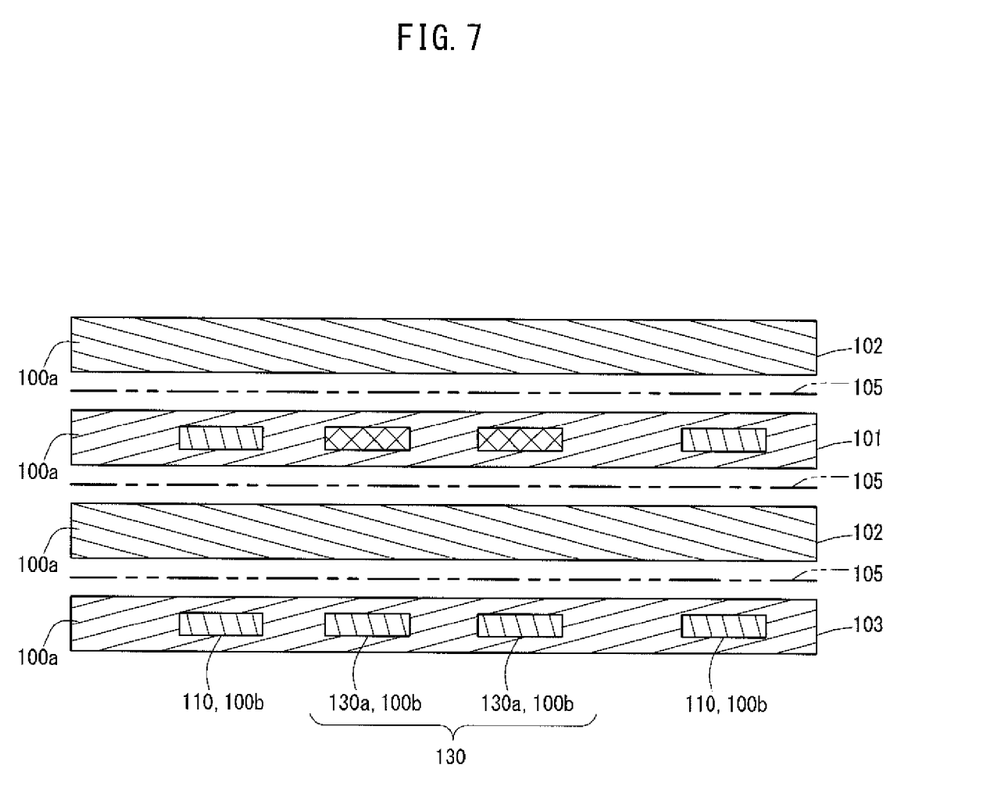
FIG. 7 is a conceptual view showing a structure of a stack-type cable in a second pattern.
Figure 8:
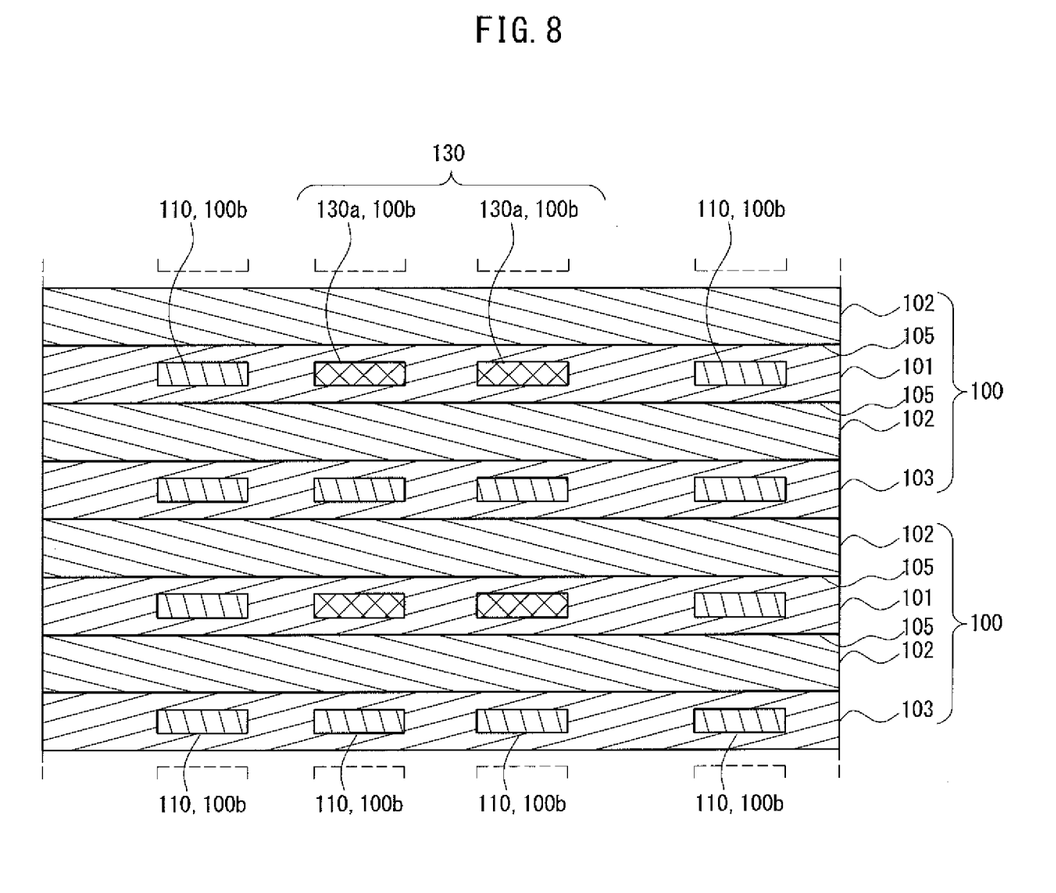
FIG. 8 is a conceptual cross-sectional view of the stack-type cable in the second pattern taken along line A-A in FIG. 3

FIG. 7 is a conceptual view showing a structure of a stack-type cable 100 in a second pattern. FIG. 8 is a conceptual cross-sectional view of the stack-type cable 100 in the second pattern taken along line A-A in FIG. 3. As shown in FIG. 7 and FIG. 8, the stack-type cable 100 in the second pattern includes the transmission path FC 101, the dummy FCs 102, and also a circuit conductor flat cable 103 including the circuit conductors 110. One dummy FC 102 is provided between the transmission path FC 101 and the circuit conductor flat cable 103 and another dummy FC 102 is provided on the transmission path FC 101 on the side opposite to the side on which the circuit conductor flat cable 103 is provided.

In the case of the stack-type cable 100 in the second pattern also, the transmission path FC 101, the dummy FCs 102 and the circuit conductor flat cable 103 adhere to each other by the grease 105 provided between the surfaces thereof along which these cables face each other.

In the state where the stack-type cable 100 including the transmission path FC 101, the dummy FCs 102 and the circuit conductor flat cable 103 is accommodated in the accommodation space S in the form of a plurality of winds, the dummy FC 102 is necessarily present between the circuit conductor flat cable 103 and the transmission path FC 101 both including the circuit conductors 110. Therefore, the electromagnetic compatibility is not decreased by the electromagnetic noise caused by a current flowing in the circuit conductors 110 in the circuit conductor flat cable 103, and thus the impedance can be stabilized.

The rotatable connector device according to the present invention corresponds to the SRC 10 in the embodiment; and similarly, the fixed-side member corresponds to the stator 12;
the rotatable-side member corresponds to the rotator 13;
the flat cable corresponds to the stack-type cable 100;
the signal conductor corresponds to the transmission path conductor 130a;
the band-like resin corresponds to the laminate sheets 100a;
the signal flat cable corresponds to the transmission path FC 101;
the dummy flat cable corresponds to the dummy FC 102;
the adhering means corresponds to the grease 105;
the conductor interval corresponds to the width-direction interval W;
the freely movable member corresponds to retainer 16; and
the folded part corresponds to the U-turn part 100c.

However, the present invention is not limited to the above-described embodiment, and may have many applications based on the technological idea defined by the claims and may be performed in many embodiments.

For example, the SRC 10 described above is to be attached to a steering part in an automobile, or a connector device in a mechanism including a rotatable part of a robot arm or the like.

REFERENCE SIGNS LIST

10 . . . SRC
12 . . . Stator
13 . . . Rotator
16 . . . Retainer
16a . . . Roller
100 . . . Stack-type cable
100a . . . Laminate sheet
100c . . . U-turn part
101 . . . Transmission path FC
102 . . . Dummy FC
103 . . . Circuit conductor flat cable
105 . . . Grease
110 . . . Circuit conductor
130a . . . Transmission path conductor
S . . . Accommodation space
W . . . Width-direction interval
w . . . Conductor width

The invention claimed is:

1. A rotatable connector device, comprising:
a fixed-side member;
a rotatable-side member rotatably attached to the fixed-side member; and
a flat cable accommodated in an annular accommodation space defined by the fixed-side member and the rotatable-side member;
wherein:
the flat cable includes
a signal flat cable including a pair of signal conductors and a band-like resin covering the pair of signal conductors, and
a dummy flat cable that is provided on at least one of a front surface and a rear surface of the signal flat cable and is formed of a band-like resin not including a conductor; and
the flat cable further includes adhering means that causes the signal flat cable and the dummy flat cable stacked on each other to adhere to each other, and to slide with respect to each other in a longitudinal direction of the flat cable.

2. A rotatable connector device according to claim 1, wherein the conductor interval between the pair of signal conductors is set to at least ten times a thickness of each of the pair of signal conductors.

3. A rotatable connector device according to claim 1, wherein:
the rotatable-side member is rotatable with respect to a rotation axis thereof in both of two rotation directions;
the accommodation space accommodates an annular freely movable member having a roller provided on a top surface thereof;
a part of the flat cable in a longitudinal direction thereof includes a folded part that is curved and folded by the roller; and
the flat cable is retained on the freely movable member.

4. A rotatable connector device according to claim 1, wherein:
the flat cable further includes, in addition to the signal flat cable and the dummy flat cable, another dummy flat cable and a circuit conductor flat cable including a circuit conductor that forms a circuit; and
one of the two dummy flat cables is provided between the signal flat cable and the circuit conductor flat cable, and the other dummy flat cable is provided on the signal flat cable on the side opposite to the side on which the circuit conductor flat cable is provided.

5. A rotatable connector device according to claim 1, wherein
a conductor interval between the pair of signal conductors is set to smaller than, or equivalent to, a conductor width of each of the pair of signal conductors.

* * * * *